No. 693,891. Patented Feb. 25, 1902.
F. R. PACKHAM & G. P. OATES.
DISK HARROW.
(Application filed Sept. 30, 1901.)
(No Model.)
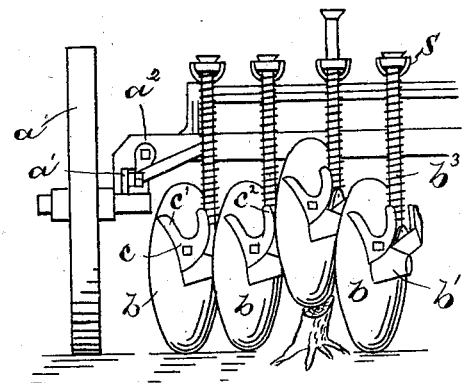
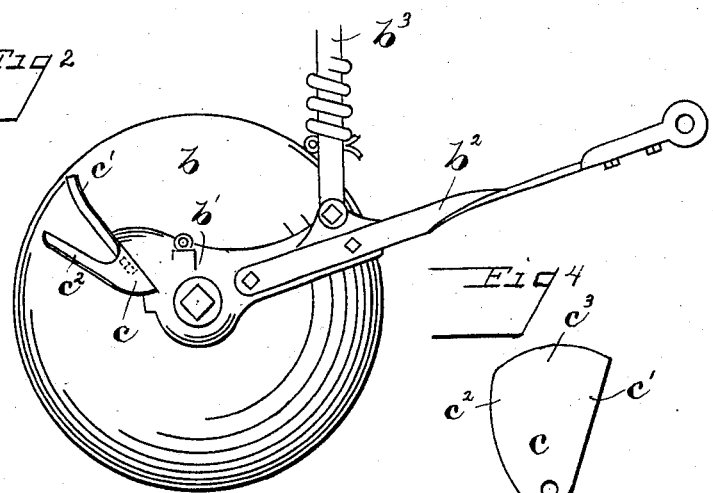
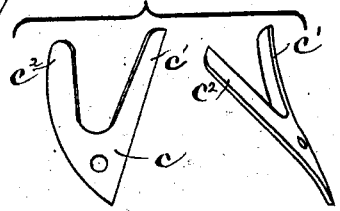
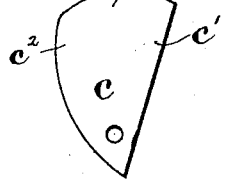
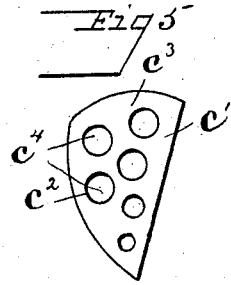
WITNESSES:
Frank L. Walker
Clifton P. Grant
INVENTORS
Frank R. Packham
and George P. Oates
BY Staley & Bowman
ATTORNEYS.
THE NORRIS PETERS CO., PHOTO-LITHO., WASHINGTON, D. C.

UNITED STATES PATENT OFFICE.

FRANK R. PACKHAM AND GEORGE P. OATES, OF SPRINGFIELD, OHIO, ASSIGNORS TO THE SUPERIOR DRILL COMPANY, OF SPRINGFIELD, OHIO, A CORPORATION OF OHIO.

DISK HARROW.

SPECIFICATION forming part of Letters Patent No. 693,891, dated February 25, 1902.

Application filed September 30, 1901. Serial No. 76,990. (No model.)

*To all whom it may concern:*

Be it known that we, FRANK R. PACKHAM and GEORGE P. OATES, citizens of the United States, residing at Springfield, in the county of Clark and State of Ohio, have invented certain new and useful Improvements in Disk Harrows, of which the following is a specification.

Our invention relates to improvements in disk harrows, and it especially relates to that class of harrows in which are employed rotating cultivating-disks which are pivoted independently to a main frame mounted upon ground or carrying wheels, such as described in Patent No. 687,259, issued November 26, 1901.

The object of our invention is to provide a scraper for the convex side of each of the disks and to combine with said scraper a clod-expeller to expel clods, roots, stubble, and other trash which may come up between the adjacent disks.

Our invention consists in the constructions hereinafter described, and pointed out in the claims.

In the accompanying drawings, Figure 1 is a rear elevation of a portion of a machine embodying our invention. Fig. 2 is a side elevation of one of the disks, with its support and connections, with our improved scraper and clod-expeller applied thereto. Fig. 3 shows detail views of the scraper and expeller. Figs. 4 and 5 are views of modifications.

Like parts are represented by similar letters of reference in the several views.

In the said drawings, $a$ represents one of the ground or gage wheels, which wheels run freely upon gudgeons connected to the main frame of the machine. This frame may be formed in any suitable manner, but is preferably constructed of a single angle-iron, one portion of which extends across the front of the machine, with side portions $a'$ extending a short distance beyond the center of the ground-wheels to form the supports therefor. These side rails are connected by a supporting bed-rail $a^2$ for supporting some of the operating parts of the machine described in our patent above referred to.

The cultivating-disks $b$ are each mounted on a suitable support $b'$, which is connected to the end of a drag-bar $b^2$, pivotally connected to the front portion of the frame of the machine. Connected to each of these disk-supports is a lifting and pressure rod $b^3$, which rods are connected in the manner described in the patent above referred to to levers for lifting and lowering the disks and exerting pressure thereon, each rod being provided with a pressure-spring in the usual manner.

It has been found necessary in the use of disk harrows to provide means for keeping the back or convex side of the disks and also the space between the adjacent disks free from mud, clods, roots, and other foreign substances which may adhere to the disks and rise up between them when the machine is in operation, and to accomplish this we have provided a combined scraper and expeller. This we have shown in the form of a casting $c$, formed with two projections or prongs $c'$ $c^2$ and attached, preferably, by means of bolts to the rear portion of the frame or support for the disk, one of these scrapers and expellers being employed for each disk. The projection or prong $c'$ is adapted to lie close to the back of the disk and conform to the contour thereof and act as a scraper to prevent mud or dirt from accumulating on the back of the disk, while the part $c^2$ stands midway between the adjacent disks and serves to expel clods, roots, stones, or anything which in being carried up by the disks would fill the space between the said disks, such trash as it is carried up coming in contact with the expeller and being prevented from passing over and lodging against the pressure-rods and on top of the disk-supports. The disks are thus kept in a condition to at all times perform their work to the best advantage, and the draft of the machine is obviously lessened.

We have shown the scraper and clod-expeller formed integrally, which is the preferable construction, although it is obvious that the parts of the device may be formed separate from each other and attached independently to the disk-support or other supporting part to which they are applied.

In Fig. 4 we have shown the scraper and expeller connected by a central web portion $c^3$ or formed in one piece, and in Fig. 5 we have shown this form of the device provided with a series of holes $c^4$ for the purpose of lightening the construction of the device.

By having the expelling devices attached to the supports for the disks, which are arranged so that they will rise and fall independently of each other, as before described, the effectiveness of the expellers in expelling the trash is materially increased by reason of the fact that in following the movements of the disks they are constantly being carried up and down within the space between the disks, and thus enabled to more effectively dislodge the trash which may be carried up between the adjacent disks.

Having thus described our invention, we claim—

1. In a disk harrow, disks mounted upon suitable supports connected to the frame of the machine, a scraper connected to each of said supports and adapted to lie in proximity to the convex side of the disk, and a projection also connected to each of said supports extending midway between the adjacent disks, for the purpose specified.

2. In a disk harrow, disks mounted upon suitable supports, a scraper and expeller consisting of a two-pronged device secured to each of said supports, one of said prongs being adapted to lie in close proximity to the convex side of the disk and the other prong adapted to stand substantially midway between the adjacent disks, substantially as specified.

3. In a disk harrow, disks mounted upon suitable supports, a scraper and expeller formed integrally with each other secured to each of said supports, said scraper being adapted to lie in close proximity to the convex side of the disk and conform to the contour thereof, and the expeller being adapted to extend midway between adjacent disks, substantially as specified.

4. In a disk harrow, disks mounted upon suitable supports, and a scraping and expelling device arranged between adjacent disks, the scraping portion of said device being adapted to lie in close proximity to the convex side of one of the adjacent disks and the expelling portion being extended to a point between said disks, substantially as specified.

5. In a disk harrow, a series of disks connected independently of each other to the main frame of the machine and provided with independent pressure devices, a scraping and expelling device arranged between adjacent disks in the series and connected to the supports for said disks so as to rise and fall with the same, substantially as and for the purpose specified.

6. In a disk harrow, a series of independent disks mounted upon suitable supports pivotally connected to the frame of the machine so as to rise and fall independently of each other, and an expeller connected to each disk-support so as to move with the same, said expeller being adapted to lie between the adjacent disks, substantially as and for the purpose specified.

In testimony whereof we have hereunto set our hands this 26th day of September, A. D. 1901.

FRANK R. PACKHAM.
GEORGE P. OATES.

Witnesses:
CHAS. I. WELCH,
CLIFTON P. GRANT.